US009066020B2

(12) United States Patent
Shigeeda (10) Patent No.: US 9,066,020 B2
(45) Date of Patent: Jun. 23, 2015

(54) IMAGE CAPTURE APPARATUS AND METHOD FOR CONTROLLING THE SAME

(71) Applicant: CANON KABUSHIKI KAISHA, Tokyo (JP)

(72) Inventor: Soichiro Shigeeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 13/926,150

(22) Filed: Jun. 25, 2013

(65) Prior Publication Data
US 2014/0002720 A1    Jan. 2, 2014

(30) Foreign Application Priority Data
Jun. 27, 2012 (JP) ................................. 2012-144590

(51) Int. Cl.
*H04N 5/235* (2006.01)
(52) U.S. Cl.
CPC ........... *H04N 5/2351* (2013.01); *H04N 5/2354* (2013.01)
(58) Field of Classification Search
CPC .................................................. H04N 5/2354
USPC .............................. 348/207.99, 362, 370, 371
See application file for complete search history.

(56) References Cited

U.S. PATENT DOCUMENTS

2006/0221223 A1\* 10/2006 Terada ....................... 348/333.05
2008/0284874 A1\* 11/2008 Odaka ......................... 348/229.1

FOREIGN PATENT DOCUMENTS

JP          09-043671 A     2/1997

\* cited by examiner

*Primary Examiner* — Tuan Ho
(74) *Attorney, Agent, or Firm* — Carter, DeLuca, Farrell & Schmidt, LLP

(57) ABSTRACT

An image capture apparatus capable of performing appropriate exposure control including determination of whether or not to fire an illuminating device for each frame shot during continuous shooting is provided. If shooting for recording was performed without firing the illuminating device during continuous shooting, a photometric value to be used to determine a control value (shooting parameter) used in subsequent shooting for recording is obtained based on image data obtained in the shooting for recording. On the other hand, if shooting for recording was performed while firing the illuminating device, the photometric value to be used to determine the control value to be used in subsequent shooting for recording is obtained based on image data obtained in shooting without firing the illuminating device that was performed after the shooting for recording and before the subsequent shooting for recording.

6 Claims, 6 Drawing Sheets

IMAGE CAPTURE APPARATUS AND METHOD FOR CONTROLLING THE SAME

BACKGROUND OF THE INVENTION

1. Field of the Invention

The present invention relates to image capture apparatuses and methods for controlling the same, and in particular to an automatic illumination and exposure control technique at the time of continuous shooting.

2. Description of the Related Art

Conventionally, whether or not to fire a flash and a flash output level during continuous shooting are determined at the time of shooting of the first frame in the continuous shooting, and flash control is performed during shooting of the second and subsequent frames also under the conditions that are determined at the time of shooting of the first frame (Japanese Patent Laid-Open No. 9-43671).

Accordingly, a determination regarding whether or not to fire the flash and a flash output level are not changed even if the luminance of a subject changes during the continuous shooting, which may result in underexposure or overexposure.

SUMMARY OF THE INVENTION

The present invention provides an image capture apparatus capable of appropriate exposure control including determination of whether or not to fire an illuminating device for each frame that is shot during continuous shooting, and a method for controlling the image capture apparatus.

According to an aspect of the present invention, there is provided an image capture apparatus capable of shooting using an illuminating device, comprising: a photometric unit configured to obtain a photometric value of a subject; and a determination unit configured to determine a control value based on the photometric value, wherein in a continuous shooting operation of the image capture apparatus, if a shooting for recording is performed without firing the illuminating device, the photometric unit obtains a photometric value to be used by the determination unit to determine a control value used in a subsequent shooting for recording, based on image data obtained in the shooting for recording that was performed without firing the illuminating device, and if a shooting for recording is performed while firing the illuminating device, the photometric unit obtains the photometric value to be used by the determination unit to determine a control value used in a subsequent shooting for recording, based on image data obtained in a shooting without firing the illuminating device that is performed after the shooting for recording performed while firing the illuminating device and before the subsequent shooting for recording.

According to another aspect of the present invention, there is provided a method for controlling an image capture apparatus that has an image sensor and is capable of shooting using an illuminating device, the method comprising: a photometric step of obtaining a photometric value of a subject; and a determination step of determining a control value based on the photometric value, wherein in the photometric step during a continuous shooting operation of the image capture apparatus, if a shooting for recording is performed without firing the illuminating device, the photometric value to be used by the determination step to determine a control value used in a subsequent shooting for recording is obtained based on image data obtained in the shooting for recording that is performed without firing the illuminating device, and if a shooting for recording is performed while firing the illuminating device, the photometric value to be used by the determination step to determine a control value used in a subsequent shooting for recording is obtained based on image data obtained in a shooting without firing the illuminating device that is performed after the shooting for recording performed while firing the illuminating device and before the subsequent shooting for recording.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings.

First Embodiment

Figure 1:
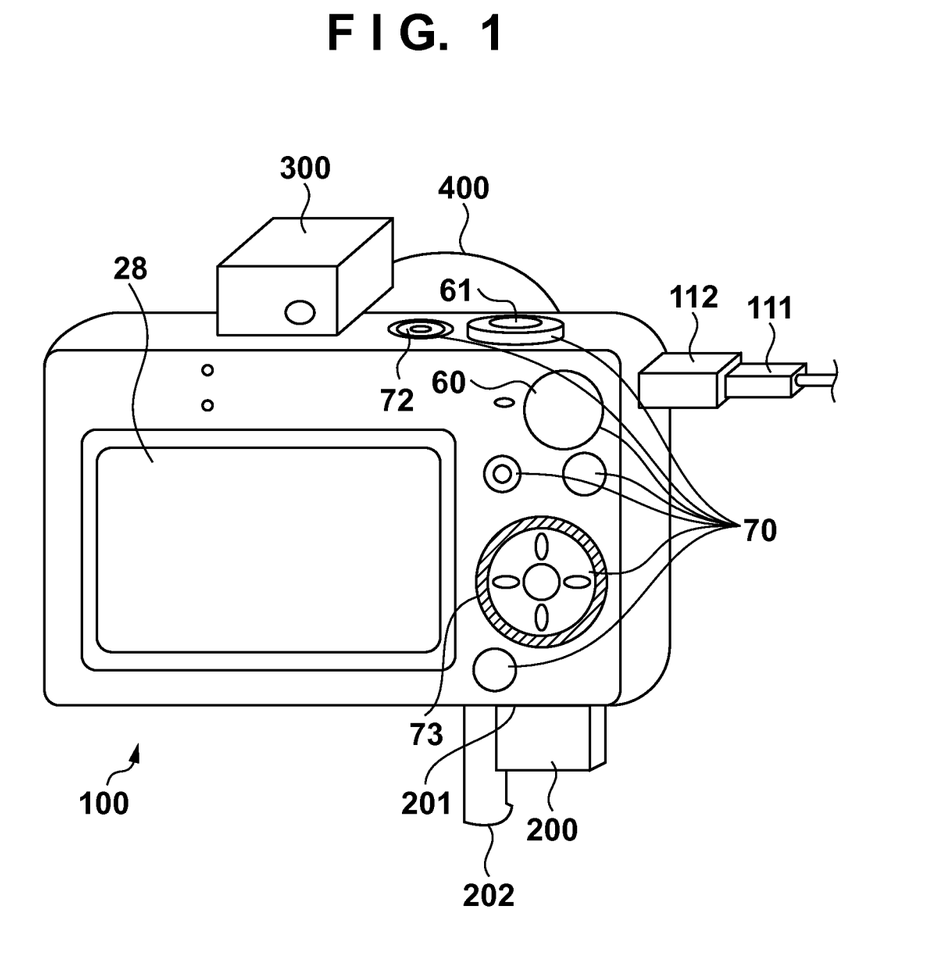
FIG. 1 is a diagram schematically showing an appearance (back side) of a digital camera, which serves as an example of an image capture apparatus according to an embodiment of the present invention.

FIG. 1 is a diagram showing an appearance (back side) of a digital camera, which serves as an example of an image capture apparatus according to an embodiment of the present invention. A display unit 28 is used to display various kinds of information related to captured images and the digital camera. The display unit 28 can also achieve a live view function, as will be described later.

A connection cable 111 can be connected to a connector 112, which may conform to some kind of standard such as USB or HDMI. An operation unit 70 has operation members such as various switches, buttons and a touch panel, and accepts various operations by a user. Typical operation members included in the operation unit 70 are a shutter button 61 for the user inputting a shooting preparation instruction and a shooting instruction to the digital camera, a mode dial 60 for switching between various modes, a rotatable controller wheel 73, and a power switch 72. A recording medium 200 such as a memory card or a hard disk, part of which protrudes from the digital camera in the drawing, is entirely accommodated within a recording medium slot 201 in practice. The recording medium 200 accommodated in the recording medium slot 201 can communicate with the digital camera 100. The recording medium slot 201 is provided with a cap 202. A flash unit 300, which serves as an exemplary illuminating device, may be an external or a built-in flash unit. Here, the flash unit 300 is of the external type in the drawing in order to clearly show the presence thereof. A lens unit 400, which may be but does not necessarily have to be detachable, is detachable here.

Figure 2:
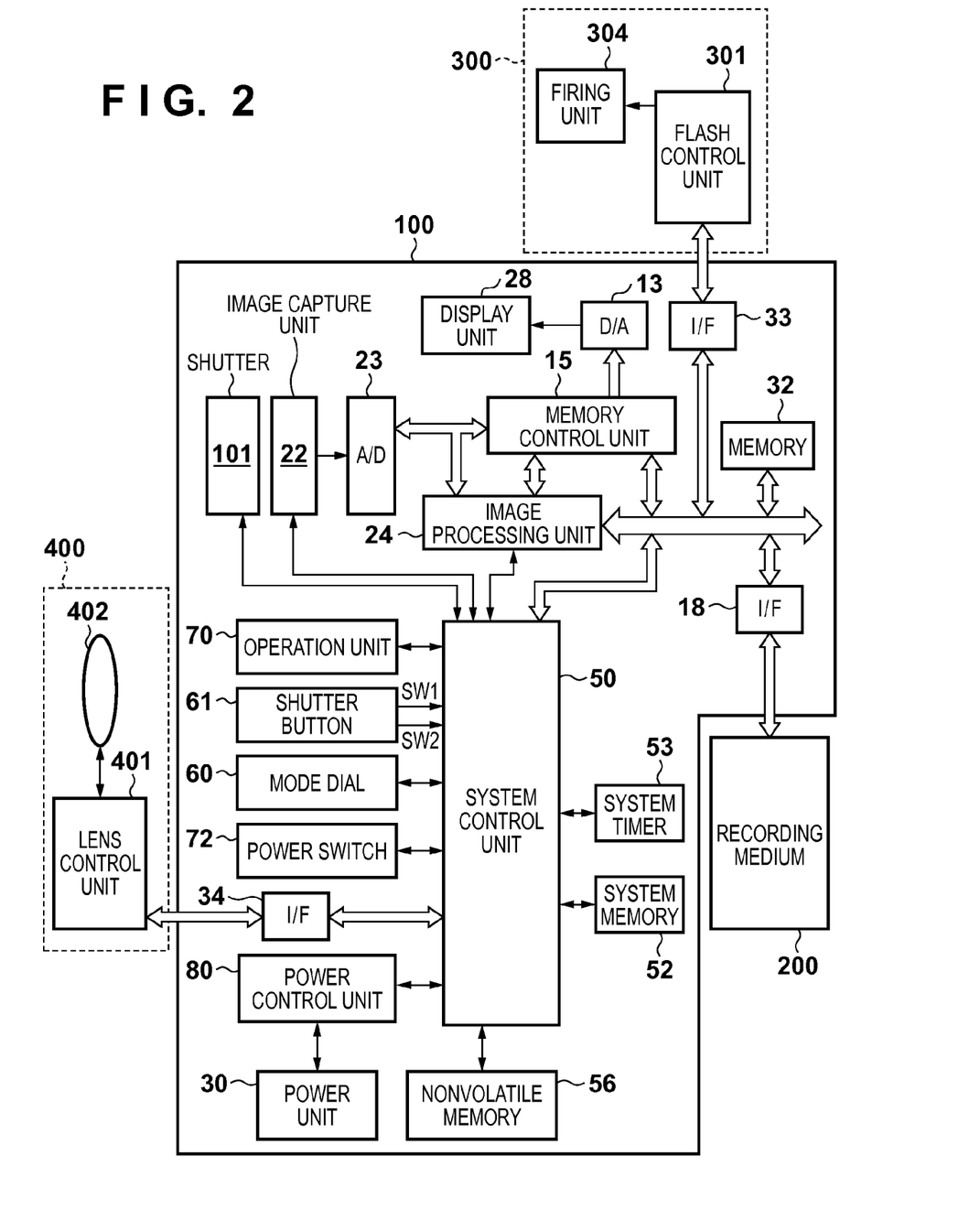
FIG. 2 is a block diagram showing an exemplary functional configuration of the digital camera of FIG. 1.

FIG. 2 is a block diagram showing an exemplary configuration of the digital camera 100 according to the present embodiment.

In FIG. 2, a shutter 101 opens and closes under control of a system control unit 50, and an image sensor included in an image capture unit 22 is exposed while the shutter 101 is open. The shutter 101 is a mechanical shutter. The image capture unit 22 is constituted by an image sensor for converting an optical image into an electric signal, such as a CCD image sensor or a CMOS image sensor, a drive circuit therefor, and the like, and converts an optical image of a subject into an analog electric signal in each pixel. An A/D converter 23 digitizes an analog signal output by the image capture unit 22 and converts it into image data.

An image processing unit 24 applies predetermined image processing, which includes color conversion processing and resizing processing such as pixel interpolation or reduction, to image data from the A/D converter 23, or image data from a memory control unit 15. Also, the image processing unit 24 performs predetermined computation processing using captured image data. The system control unit 50 performs exposure control and focusing control based on the obtained computation result, thus achieving functions of TTL (through-the-lens)-AF (auto-focus), AE (auto-exposure), and EF (flash pre-firing). The image processing unit 24 further performs predetermined computation processing using captured image data, and also performs TTL-AWB (auto-white balancing) processing based on the obtained computation result.

Image data output by the A/D converter 23 is written in a memory 32 via the image processing unit 24 and the memory control unit 15, or directly via the memory control unit 15. The memory 32 stores image data that is obtained by the image capture unit 22 and converted into digital data by the A/D converter 23, and image data to be displayed on the display unit 28. The memory 32 is provided with a sufficient storage capacity for storing a predetermined number of still images, as well as moving images and sound for a predetermined period of time.

The memory 32 also serves as a memory (video memory) for image display. A D/A converter 13 converts image data to be displayed that is stored in the memory 32 into an analog signal, and supplies it to the display unit 28. Thus, the image data to be displayed that is written in the memory 32 is displayed by the display unit 28 via the D/A converter 13. The display unit 28 performs display on a display device, such as an LCD, according to an analog signal from the D/A converter 13. Digital signals that is once subjected to A/D conversion by the A/D converter 23 and stored in the memory 32 is converted into an analog signal by the D/A converter 13 and sequentially transferred to and displayed on the display unit 28, and a live view function is thereby achieved. Note that a moving image (display image) that is displayed by the display unit 28 while a live view operation is being executed is also called live view image or through-the-lens image. A display image is captured by reading out a signal at predetermined intervals (using a so-called electronic shutter) in a state in which the shutter 101 is fully opened and the image sensor in the image capture unit 22 is exposed.

A nonvolatile memory 56 is an electrically erasable and recordable memory, and is an EEPROM, for example. The nonvolatile memory 56 stores constants, programs, and the like for operations of the system control unit 50. "Programs" mentioned here are programs for executing various flowcharts, which will be described later in the present embodiment.

The system control unit 50 controls the entire digital camera 100. It achieves processing of the present embodiment, which will be described later, by executing the programs recorded in the aforementioned nonvolatile memory 56. A system memory 52 is a RAM, for example, and is used to store constants and variables for operations of the system control unit 50 and expand programs or the like read out from the nonvolatile memory 56. The system control unit 50 also performs display control by controlling the memory 32, the D/A converter 13, the display unit 28, and the like.

A system timer 53 measures time used in various kinds of control and time of a built-in clock.

FIG. 2 shows the mode dial 60, the shutter button 61, and the power switch 72 separately from the operation unit 70 for the sake of convenience, but these components constitute part of the operation unit 70. Also, the shutter button 61 has a first shutter switch SW1 that is turned on when the shutter button 61 is half-pressed, and a second shutter switch SW2 that is turned on when the shutter button 61 is full-pressed.

The turning on of the first shutter switch SW1 is a shooting preparation instruction, and the system control unit 50 starts shooting preparation operations such as AF (auto-focusing) processing, AE (auto-exposure) processing, AWB (auto-white balancing) processing, and EF (flash pre-firing) processing.

The turning on of the second shutter switch SW2 is a shooting instruction, and the system control unit 50 performs shooting using a control value that is determined in the shooting preparation operations.

Then, the system control unit 50 starts a series of shooting process operations from reading of an analog signal from the image capture unit 22 up to writing of image data in the recording medium 200. Note that hereinafter, shooting in which a series of shooting processes from the reading of an analog signal from the image capture unit 22 up to the writing of image data in the recording medium 200 is performed will be referred to as shooting for recording. Here, shooting for recording is part of the series of shooting processes, and corresponds to processing for exposing the image sensor and accumulating charge for a desired period of time in order to obtain image data to be written in the recording medium 200.

The mode dial 60 is used to switch the operation mode of the digital camera to a still image recording mode, a moving image recording mode, a reproduction mode, or the like. The modes included in the still image recording mode are a continuous shooting mode (drive mode), an auto-shooting mode, an auto-scene recognition mode, a manual mode, various scene modes that are shooting settings for different shooting scenes, a program AE mode, a custom mode, and so on. The operation mode can be directly switched with the mode dial 60 to any of these modes included in the still image recording mode. Alternatively, the operation mode may be switched to any of these modes included in the still image recording mode using another operation member, after once being switched with the mode dial 60 to the still image recording mode. Similarly, the moving image recording mode may also include multiple modes.

The operation members in the operation unit 70 are assigned to appropriate functions for each situation by selecting various function icons displayed on the display unit 28, and work as various function buttons. Examples of the function buttons include an "end" button, a "return" button, a "forward image" button, a "jump" button, a "refine" button, and a "change attribute" button. For example, upon a menu button being pressed, a menu screen on which various settings can be configured is displayed on the display unit 28. A user can configure various settings intuitively using the menu screen displayed on the display unit 28, a four-directional button operative in up-down and left-right directions, and a SET button.

The controller wheel 73 is a rotatable operation member included in the operation unit 70, and is used together with the directional button when instructing selection items, and the like. Upon the controller wheel 73 being rotated, an electric pulse signal is generated in accordance with the amount of operation, and the system control unit 50 controls the components of the digital camera 100 based on this pulse signal. With the pulse signal, it is possible to determine the angle by which the controller wheel 73 is rotated, the number of rotations, and the like. Note that the controller wheel 73 may be any kind of operation member whose rotational operation can be detected. For example, the controller wheel 73 may be a dial operation member that rotates and generates a pulse signal in accordance with a rotational operation by the user. Alternatively, the controller wheel 73 may be an operation member constituted by a touch sensor that does not rotate but detects rotational movement of a finger of the user on the controller wheel 73 (so-called touch wheel).

A power control unit 80 is constituted by a battery detection circuit, a DC-DC converter, a switch circuit for switching a block to be energized, and the like, and detects the presence of an attached battery, the battery type, and the remaining battery level. The power control unit 80 also controls the DC-DC converter based on the result of the above detection and an instruction from the system control unit 50, and supplies necessary voltage to the components including the recording medium 200 for a necessary period of time.

A power unit 30 is constituted by a primary battery such as an alkaline battery or a lithium battery, a secondary battery such as a Ni—Cd battery, a NiMH battery, or a Li battery, an AC adapter, and the like. A recording medium I/F 18 is an interface for the recording medium 200, such as a memory card or a hard disk. The recording medium 200 is a recording medium for recording captured images, such as a memory card, and is constituted by a semiconductor memory, a magnetic disk, or the like.

The flash unit 300 is a flash that is attached to the digital camera 100 in a detachable manner. A flash control unit 301 includes a CPU, for example, and controls operations of blocks in the flash unit 300 in accordance with an instruction that is input from the system control unit 50 via an I/F 33. Specifically, the flash control unit 301 controls the output level, output time, output lighting angle, and the like. A firing unit 304 fires the flash with voltage instructed by the flash control unit 301.

The lens unit 400 is a detachable lens unit, and is a lens group including a zoom lens, a focus lens, and a diaphragm. A lens control unit 401 includes a CPU, for example, and controls each block of the lens unit in accordance with an instruction that is input from the system control unit 50 via an I/F 34. Specifically, the lens control unit 401 controls the zoom lens, the focus lens, and the diaphragm.

Next, an operation of the digital camera of the present embodiment during a continuous shooting operation will be described. In the first embodiment, a photometric method used during the continuous shooting operation is switched depending on whether or not the flash is fired for the shooting. Note that "continuous shooting" in the present specification means continuous shooting in the still image recording mode, for example, and is shooting in a state in which the continuous shooting (drive mode) is selected, for example.

Figure 3:
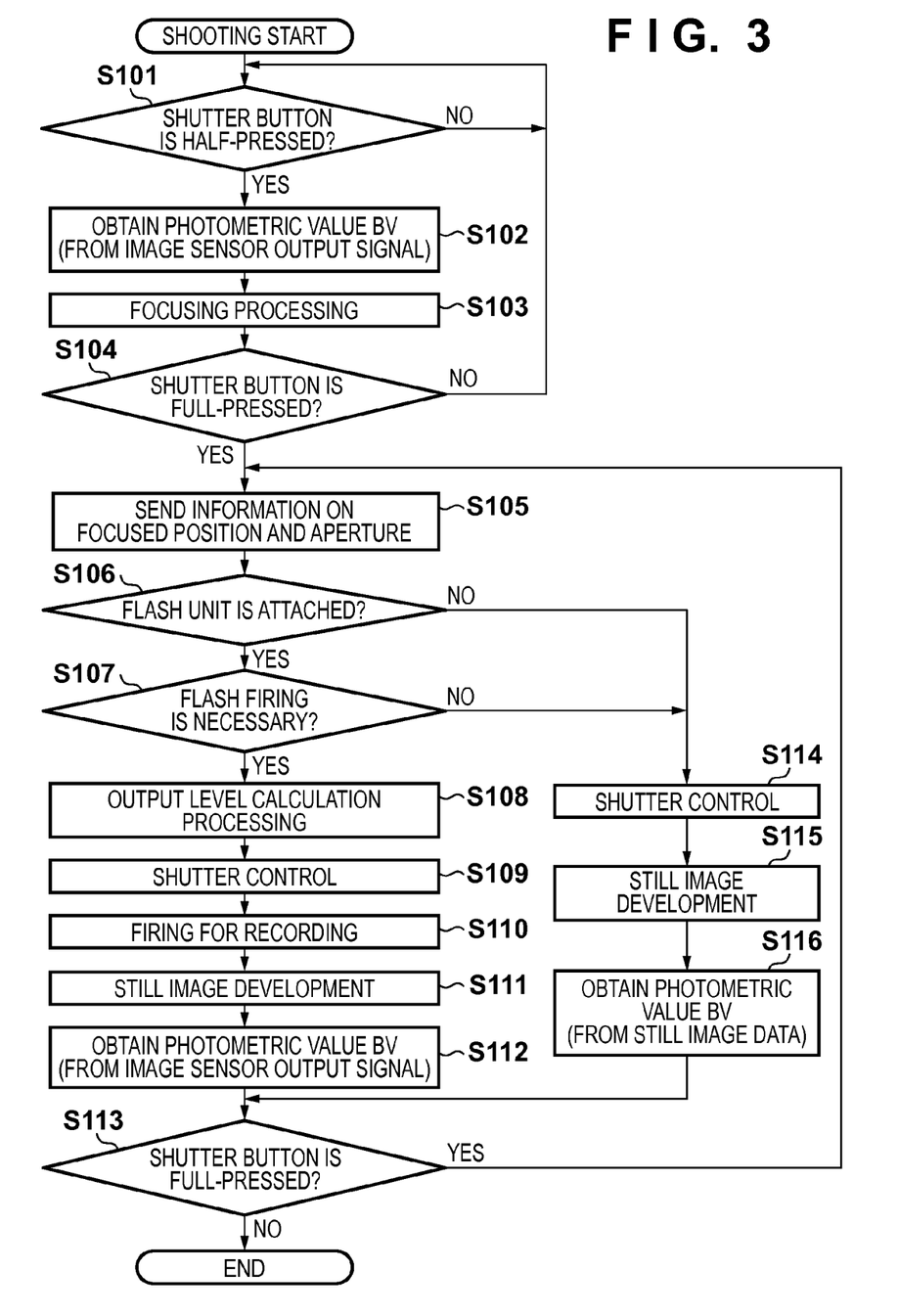
FIG. 3 is a flowchart for illustrating a shooting operation according to a first embodiment of the present invention.

FIG. 3 is a flowchart for illustrating a shooting operation according to the first embodiment. Each process in this flowchart is achieved by the system control unit 50 expanding a program stored in the nonvolatile memory 56 into the system memory 52, executing the program, and controlling the components.

In step S101, the system control unit 50 distinguishes whether or not the first shutter switch SW1 in the shutter button 61 is in an on state (i.e., whether the shutter button 61 is being half-pressed). If it is detected that the shutter button 61 is being half-pressed, the system control unit 50 advances processing to step S102. Note that the operation in step S102 and subsequent steps is executed in the case where the shutter button 61 is being at least half-pressed, and the system control unit 50 forcibly advances processing to step S101 at the point in time when the shutter button 61 is not being half-pressed or full-pressed any more.

In step S102, the system control unit 50 requests a photometric value from the image processing unit 24. The image processing unit 24 performs predetermined computation processing on image data captured by the image capture unit 22 to obtain a photometric value (subject luminance value), and transmits the photometric value to the system control unit 50. The system control unit 50 calculates control values for an appropriate aperture, shutter speed (charge-accumulation time), photographic sensitivity, and so on using, for example, a program diagram that is stored in advance, and based on the photometric value. Note that the types of control value that need to be calculated are different depending on the type of the set still image recording mode, and it is not necessary to always calculate the aperture, the shutter speed (charge-accumulation time), and the photographic sensitivity. The system control unit 50 stores the calculated control values and photometric value in the system memory 52, and advances processing to step S103.

In step S103, the system control unit 50 gives the lens control unit 401 an instruction to start scan of the focus lens, and gives the image processing unit 24 an instruction to calculate focus evaluation values. From the focus evaluation values obtained with respect to the image data obtained by performing shooting at different focus lens positions, the system control unit 50 calculates an appropriate focus lens position. The system control unit 50 stores information of the calculated focus lens position in the system memory 52, and advances processing to step S104. Note that the focus detection method is not limited to this, and other methods, such as a phase difference detection method, may also be used.

In step S104, the system control unit 50 distinguishes whether or not the second shutter switch SW2 in the shutter button 61 is in an on state (i.e., whether the shutter button 61 is being full-pressed). If the shutter button 61 is being full-pressed, the system control unit 50 advances processing to step S105, and if not being full-pressed, it returns processing to step S101.

In step S105, the system control unit 50 reads out the information of the aperture and the focus lens position stored in steps S102 and S103 from the system memory 52, transmits the information to the lens control unit 401, and advances processing to step S106.

In step S106, the system control unit 50 detects whether or not the flash unit 300 is attached. If it is detected that the flash unit 300 is attached, the system control unit 50 advances processing to step S107, and if it is not detected that the flash unit 300 is attached, it advances processing to step S114.

In step S107, the system control unit 50 retrieves the latest photometric value from the system memory 52 and determines whether or not to fire the flash unit 300 is necessary during the shooting. If it is determined that firing is necessary, the system control unit 50 advances processing to step S108, and if it is determined that firing is not necessary, it advances processing to step S114.

In step S108, the system control unit 50 determines the output level of the flash unit 300 attached to the digital camera 100, and advances processing to step S109.

A method for determining the flash output level of the present embodiment will be described. Before pre-firing of the flash unit 300, the system control unit 50 stores, in the system memory 52, a subject luminance (non-firing photometric value) obtained by the image processing unit 24 based on, for example, an image captured for display on the EVF (in a state in which the flash unit 300 is not fired). Subsequently, the system control unit 50 gives the flash control unit 301 a pre-firing instruction. The flash control unit 301 performs pre-firing of the firing unit 304 in accordance with the instruction by the system control unit 50. The system control unit 50 obtains a subject luminance (pre-firing photometric value) obtained by the image processing unit 24 based on an image captured at the time of pre-firing, and stores it in the system memory 52. Note that pre-firing is firing performed prior to firing (firing for recording) for shooting of an image to be recorded (i.e., shooting for recording), and is performed to compute the output level at the time of firing for recording. The system control unit 50 determines the output level at the time of firing for recording (output level for recording) by performing computation using the non-firing photometric value and the pre-firing photometric value that are stored in the system memory 52.

Note that in the above description of the present embodiment, it is assumed that the system control unit 50 performs photometric processing before pre-firing of the flash unit 300 and obtains a photometric value of a subject when calculating the output level for recording. However, the system control unit 50 may alternatively use a photometric value of the subject obtained in, for example, step S102, or in step S113 or S116, which will be described later, rather than performing photometry immediately before pre-firing.

In step S109, the system control unit 50 reads out the information of the shutter speed and the like stored in step S102 from the system memory 52, controls the travel timing of the shutter 101 based on the information, and advances processing to step S110.

Here, travel of the shutter 101 can be controlled using an electromagnetic method by which current is cut out at a controlled timing to cause the shutter to travel, for example.

In step S110, the system control unit 50 retrieves the information of the output level for recording stored in step S108 from the system memory 52 and transmits it to the flash control unit 301. The system control unit 50 controls the flash firing timing, gives the flash control unit 301 an instruction of the firing timing, and advances processing to step S111. The flash control unit 301, upon receiving the firing timing instruction fires the firing unit 304 with the output level for recording. Thus, the shooting for recording accompanied by flash firing is executed. After the firing of the flash unit 300, the system control unit 50 fully closes the shutter 101 at a timing appropriate for the shutter speed. In other words, the shooting for recording is performed in steps S109 and S110 if the flash unit 300 is required to fire.

In step S111, the system control unit 50 gives the image processing unit 24 an instruction to apply development processing to a still image obtained in the shooting for recording. The image processing unit 24 performs predetermined development processing on the image data output from the A/D converter 23 and generates still image data. Further, the image processing unit 24 analyzes the still image data after being subjected to the development processing and calculates a photometric value. The system control unit 50 stores the photometric value obtained from the image after being subjected to the development processing in the system memory 52. Also, after completion of the development processing by the image processing unit 24, the system control unit 50 opens the shutter 101 to bring the image capture unit 22 into an exposed state, and advances processing to step S112.

Since the photometric value obtained in step S111 is a value calculated based on the still image data at the time of shooting for recording, it is a value that has been corrected so that the brightness of the subject is appropriately adjusted using the flash light fired in step S110, and is therefore not a photometric value of the subject in a state in which the flash is not fired. Therefore, if the subsequent frame is shot based on the photometric value obtained in step S111, an image with a proper exposure level cannot be obtained in a case where the condition of the subject has changed since the shooting of the first frame. For example, in a case where the brightness of the subject has changed, or in a case where the subject has moved, overexposure or underexposure is expected to be caused. For this reason, a current photometric value of the subject needs to be obtained prior to shooting of the subsequent frame in the continuous shooting accompanied by flash firing.

In step S112, the system control unit 50 requests the photometric value of the subject from the image processing unit 24, as in step S102. Since the image capture unit 22 has been exposed since the point in time when the development processing was complete as mentioned above, shooting using the electronic shutter is possible, such as live view image shooting. The image processing unit 24 calculates the photometric value using the image data captured by the image capture unit 22, and transmits the photometric value to the system control unit 50. Note that the image captured here is not an image to be recorded, and is therefore not recorded as a still image. As described above, in the present embodiment, in the case where an image to be recorded is captured with flash firing, the control values used in shooting of the subsequent image to be recorded is determined based on the photometric value obtained from the image captured without flash firing after the shooting of the current image to be recorded and before the shooting of the subsequent image to be recorded. The system control unit 50 stores the determined control values and photometric value in the system memory 52, and advances processing to step S113.

In step S113, the system control unit 50 distinguishes whether or not the second shutter switch SW2 in the shutter button 61 is in an on state (i.e., whether the shutter button 61 is being full-pressed), as in step S104. If the shutter button 61 is being full-pressed, the system control unit 50 advances processing to step S105, and if not being full-pressed, it ends the continuous shooting operation.

In step S114, the system control unit 50 reads out the information of the shutter speed and the like stored in step S102 from the system memory 52 and controls the travel timing of the shutter based on the information, as in step S109, and advances processing to step S115. In other words, in the case where the flash unit 300 is not fired, the shooting for recording is performed in step S114.

In step S115, the system control unit 50 gives the image processing unit 24 an instruction to apply development processing to a still image obtained in the shooting for recording, as in step S111. The image processing unit 24 performs predetermined development processing on the image data output from the A/D converter 23 and generates still image data. Further, the image processing unit 24 analyzes the still image data after being subjected to the development processing and calculates a photometric value. The system control unit 50 stores the photometric value obtained from the image after being subjected to the development processing in the system memory 52. Also, after completion of the development processing by the image processing unit 24, the system control unit 50 opens the shutter 101 to bring the image capture unit 22 into an exposed state, and advances processing to step S116.

In step S116, the system control unit 50 obtains the photometric value stored in step S115 from the system memory 52, and calculates appropriate control values based on this photometric value. The photometric value obtained in step S115 is obtained from the image to be recorded that is captured without flash firing. Therefore, it is not necessary to obtain the exposure level or determine shooting parameters using the image captured with the electronic shutter after the shooting of the image to be recorded (and before the shooting of the subsequent image to be recorded). The system control unit 50 stores the calculated control values and photometric value in the system memory 52. It then advances processing to step S113.

Figure 4:
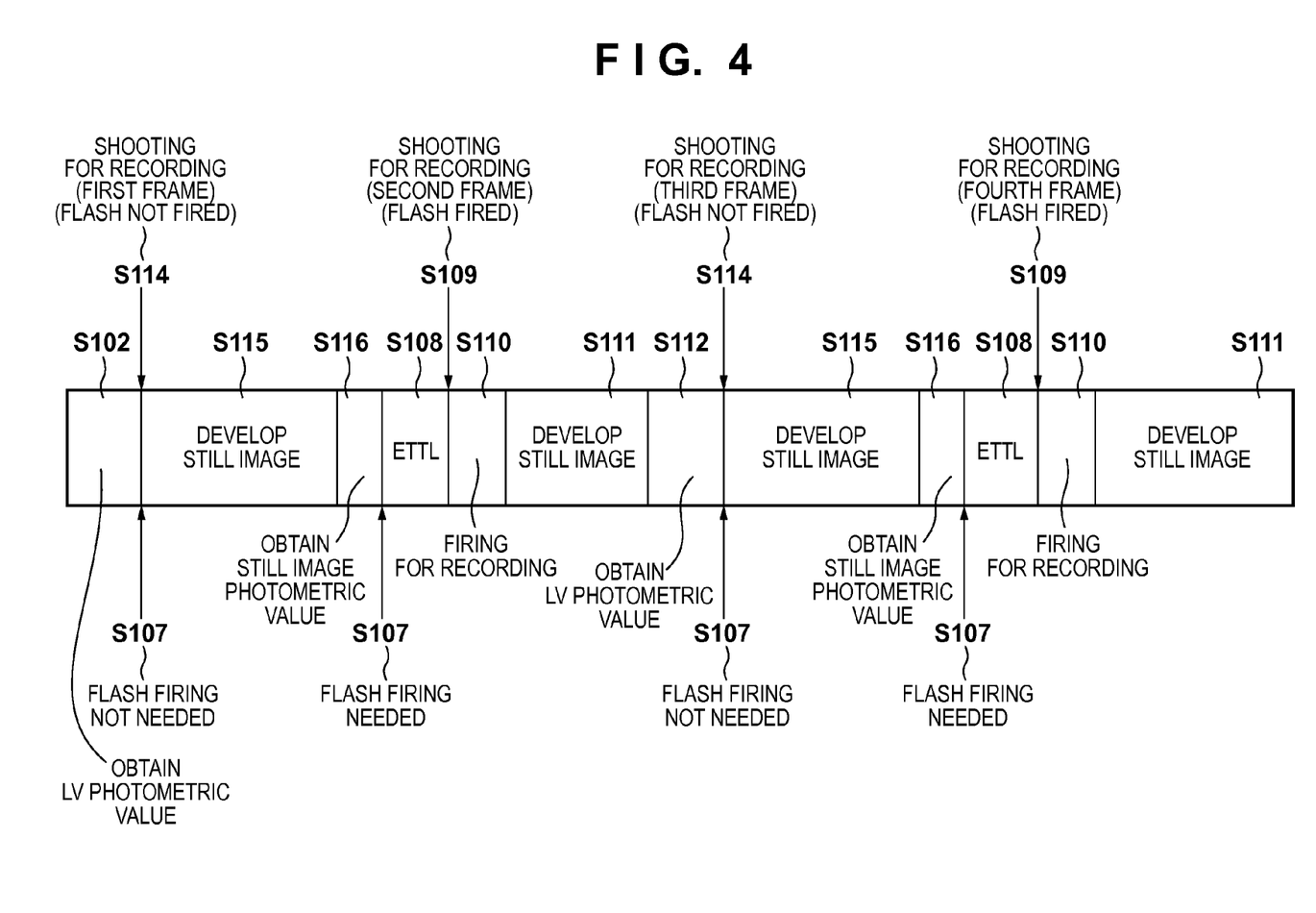
FIG. 4 is a diagram schematically showing an exemplary operation during continuous shooting to which the operation shown in FIG. 3 is applied.

FIG. 4 is a diagram schematically showing, in time series, an exemplary operation during continuous shooting to which the operation shown in FIG. 3 is applied. Note that although FIG. 4 shows the steps in the order of execution, the difference in the width of each window corresponding to a step does not necessarily represent the relative length of processing time, and for example, processing of a wider window does not necessarily take a longer time than processing of a narrower window.

FIG. 4 shows an exemplary case where four frames are shot by continuous shooting, and the reference numerals correspond to those in FIG. 3. As shown in FIG. 4, during continuous shooting, photometric processing for a frame subsequent to the frame that is shot using the flash is performed based on a live view image, which is not the image to be recorded, and photometric processing for a frame subsequent to the frame that is shot without using the flash is performed based on the image to be recorded. Therefore, photometric processing can be performed without being affected by flash light, and appropriate exposure control for each frame can be achieved.

As described above, according to the first embodiment, in the case where shooting accompanied by flash firing is performed during continuous shooting, an image is captured without flash firing before the shooting of the subsequent frame, and the control values for the subsequent frame are determined based on the photometric value obtained from this image. Therefore, appropriate control values, including a control value indicating whether or not flash firing is necessary, can be determined before the shooting of each frame, and an image of a proper exposure level can be obtained even if the brightness of the subject changes or the subject moves during continuous shooting.

Second Embodiment

Next, a second embodiment of the present invention will be described. The feature of the present embodiment lies in that after it is determined whether or not the flash unit has a firing switching function, the photometric method used during a continuous shooting operation is switched in accordance with a charge state of a capacitor (i.e., whether the capacitor is in a state in which firing is possible).

Note that the flash unit having the firing switching function is a flash unit whose firing/not firing can be controlled on the camera side, such as that described in the first embodiment.

Figure 5A:
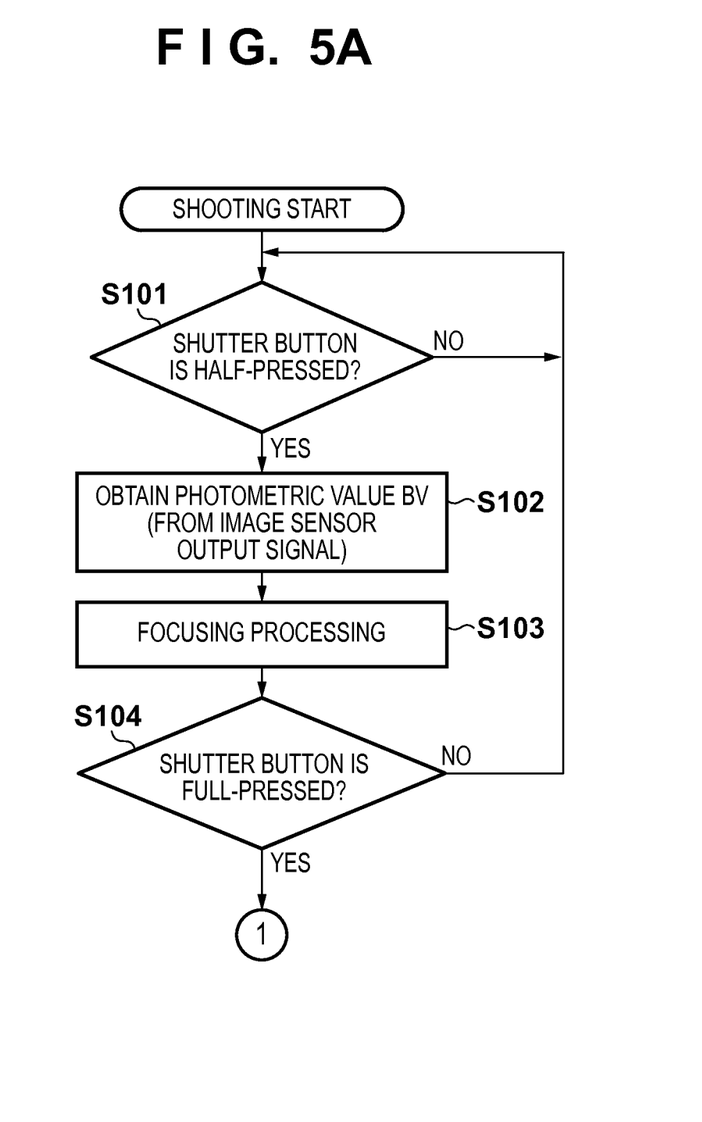
FIGS. 5A and 5B are flowcharts for illustrating a shooting operation according to a second embodiment of the present invention.
Figure 5B:
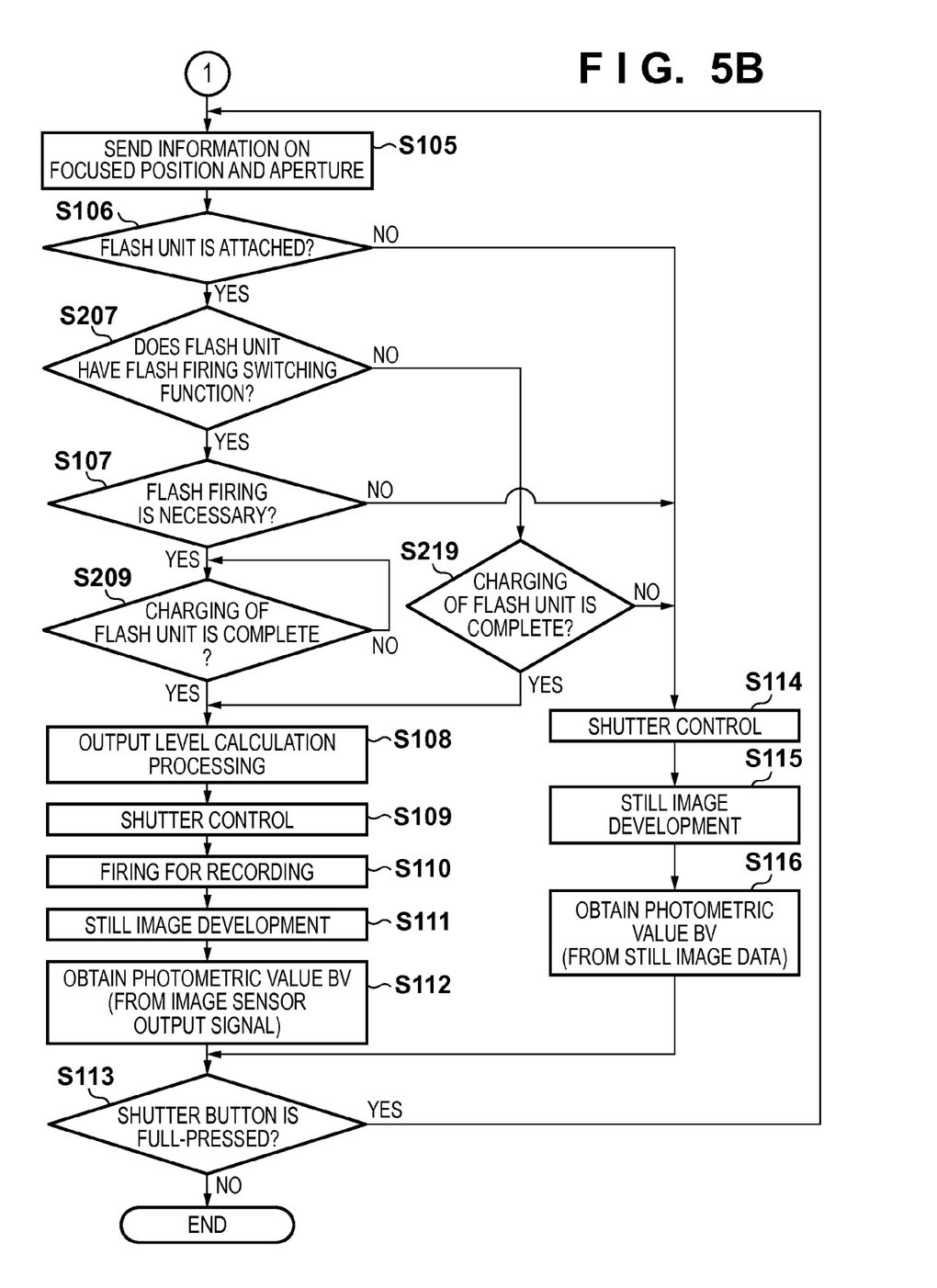

FIGS. 5A and 5B are flowcharts for illustrating a shooting operation in a digital camera according to the second embodiment. Also in the following description of the present embodiment, it is assumed that the shooting operation is executed by the digital camera shown in FIGS. 1 and 2. Each process in the flowcharts of FIGS. 5A and 5B are achieved by the system control unit 50 deploying a program stored in the nonvolatile memory 56 into the system memory 52, executing the program, and controlling the components. Note that in FIGS. 5A and 5B, steps in which the same processes as those in FIG. 3 are performed are given the same reference numerals, and only the processes that are unique to the present embodiment will be described.

In step S207, the system control unit 50 communicates with the flash control unit 301 in the attached flash unit 300 that has been detected, and obtains information on the flash unit 300. The system control unit 50 determines whether or not the flash unit 300 has the firing switching function, based on the information on the flash unit. If the flash unit 300 has the firing switching function, the system control unit 50 advances processing to step S107, and if the flash unit 300 does not have the firing switching function, it advances processing to step S219.

In step S107, the system control unit 50 retrieves the latest photometric value from the system memory 52 and determines whether or not to fire the flash unit 300 is necessary at the time of shooting. If it is determined that firing is necessary, the system control unit 50 advances processing to step S209, and if it is determined that firing is not necessary, it advances processing to step S114.

In step S209, the system control unit 50 communicates with the flash control unit 301 and obtains the information on the flash unit 300. The system control unit 50 determines whether or not the flash unit 300 is in a state capable of firing (i.e., whether charging of the capacitor is complete), based on the information on the flash unit 300. If the flash unit 300 is not in a state capable of firing, the system control unit 50 waits until the flash unit 300 becomes capable of firing (i.e., until charging is complete). On the other hand, if the flash unit 300 is in a state capable of firing, the system control unit 50 advances processing to step S108, and starts the shooting operation for recording accompanied by flash firing.

In step S219, the system control unit 50 obtains the information on the flash unit 300, as in step S209, and determines whether or not the flash unit 300 is in a state capable of firing (i.e., whether charging of the capacitor is complete). If the flash unit 300 is not in a state capable of firing, the system control unit 50 advances processing to step S114 and starts the shooting operation for recording, without waiting until the flash unit 300 becomes capable of firing (i.e., until charging is complete). By starting shooting processing for recording before the flash unit becomes capable of firing, it is possible to perform shooting for recording without firing the flash unit that does not have the firing switching function. On the other hand, if the flash unit 300 is in a state capable of firing, the system control unit 50 advances processing to step S108, and starts the shooting operation for recording accompanied by flash firing.

As described above, according to the second embodiment, the same effect as that in the first embodiment can be achieved in the case where a flash unit having the firing switching function is attached. Meanwhile, in the case where a flash unit that does not have the firing switching function is attached, the method for obtaining a photometric value that is used to determine the control values for shooting of the subsequent frame is switched in accordance with whether or not the flash is in a state capable of firing at the time of the shooting for recording. For this reason, an image of each frame can be obtained with a proper exposure level even if the brightness of a subject changes or the subject moves during a continuous shooting operation.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the above-described two embodiments, if shooting is performed with flash firing during continuous shooting, the control values for the subsequent frame are determined based on a live view image that is captured without flash firing before shooting of the subsequent frame. However, the image captured without flash firing does not need to be a live view image (i.e., an image obtained for the purpose of display), and it may be an image that is captured only for determination of the control values for the subsequent frame. Accordingly, the image used for determination of the control values for the subsequent frame may be, but does not have to be displayed.

Also, the above-described embodiments describe the case where if shooting accompanied by flash firing is performed during continuous shooting, an image captured without flash firing before the shooting of the subsequent frame is used in determination of the control values for the shooting of the subsequent frame. However, the image captured without flash firing can also be used in determination of arbitrary values for which determination based on an image captured without flash firing is desirable, as well as in the determination of the control values for shooting of the subsequent frame. Note that it is apparent that the arbitrary values do not have to be values to be used in shooting of the subsequent frame.

This application claims the benefit of Japanese Patent Application No. 2012-144590, filed on Jun. 27, 2012, which is hereby incorporated by reference herein its entirety.

What is claimed is:

1. An image capture apparatus capable of shooting using an illuminating device, comprising:
  a photometric unit configured to obtain a photometric value of a subject; and
  a determination unit configured to determine a control value based on the photometric value,
  wherein in a continuous shooting operation of the image capture apparatus, in a case that a shooting for recording is performed without firing the illuminating device, the photometric unit obtains a photometric value to be used by the determination unit to determine a control value used for a subsequent shooting for recording, based on image data obtained in the shooting for recording that was performed without firing the illuminating device, and in a case that a shooting for recording is performed with firing the illuminating device, the photometric unit obtains the photometric value to be used by the determination unit to determine a control value used for a subsequent shooting for recording, based on image data obtained in a shooting without firing the illuminating device that is performed after the shooting for recording performed with firing the illuminating device and before the subsequent shooting for recording.

2. The image capture apparatus according to claim 1, wherein the image data obtained in the shooting without firing the illuminating device that is performed after the shooting for recording performed with firing the illuminating device and before the subsequent shooting for recording is image data that is based on a signal read out from an image sensor in a state in which the image sensor is exposed.

3. The image capture apparatus according to claim 1, wherein the image data obtained in the shooting without firing the illuminating device that is performed after the shooting for recording performed with firing the illuminating device and before the subsequent shooting for recording is image data for display.

4. The image capture apparatus according to claim 1, further comprising an obtaining unit configured to obtaining information on the illuminating device,
  wherein the determination unit further determines whether or not to fire the illuminating device in the subsequent shooting for recording, based on the photometric value, and
  in a case that it is determined from the information that the illuminating device does not have a firing switching function with which the image capture apparatus can control whether or not to fire the illuminating device and that the illuminating device is not in a state capable of firing, the subsequent shooting for recording is started without waiting until the illuminating device becomes capable of firing.

5. The image capture apparatus according to claim 4,
  wherein in a case that it is determined from the information that the illuminating device has the firing switching function with which the image capture apparatus can control whether or not to fire the illuminating device and that the illuminating device is not in a state capable of firing, the subsequent shooting for recording is started after waiting until the illuminating device becomes capable of firing.

6. A method for controlling an image capture apparatus that has an image sensor and is capable of shooting using an illuminating device, the method comprising:
  a photometric step of obtaining a photometric value of a subject; and
  a determination step of determining a control value based on the photometric value,
  wherein in the photometric step during a continuous shooting operation of the image capture apparatus, in a case that a shooting for recording is performed without firing the illuminating device, the photometric value to be used by the determination step to determine a control value used for a subsequent shooting for recording is obtained based on image data obtained in the shooting for recording that is performed without firing the illuminating device, and in a case that a shooting for recording is performed with firing the illuminating device, the photometric value to be used by the determination step to determine a control value used for a subsequent shooting for recording is obtained based on image data obtained in a shooting without firing the illuminating device that is performed after the shooting for recording performed with firing the illuminating device and before the subsequent shooting for recording.

* * * * *